United States Patent [19]
Yamashita et al.

[11] Patent Number: 5,180,640
[45] Date of Patent: Jan. 19, 1993

[54] MAGNETIC RECORDING MEDIUM COMPRISING A MAGNETIC ALLOY LAYER OF COBALT NICKEL, PLATINUM AND CHROMIUM FORMED DIRECTLY ON A NICKEL ALLOY AMORPHOUS UNDERLAYER

[75] Inventors: Tsutomu T. Yamashita, San Jose; Phuong Nguyen, Milpitas; Tu Chen, Monte Sereno, all of Calif.

[73] Assignee: Komag, Inc., Milpitas, Calif.

[21] Appl. No.: 590,885

[22] Filed: Oct. 1, 1990

[51] Int. Cl.[5] .............................. G11B 5/00
[52] U.S. Cl. .................. 428/611; 428/900; 428/668; 428/660; 428/928; 428/694; 204/192.15; 204/192.2
[58] Field of Search ............ 428/694, 900, 611, 621, 428/667, 668, 670, 928, 680; 204/192.15, 192.2

[56] References Cited

U.S. PATENT DOCUMENTS

| | | | |
|---|---|---|---|
| 4,418,126 | 11/1983 | Izumi et al. | 428/694 |
| 4,438,066 | 3/1984 | Aboaf et al. | 420/435 |
| 4,610,911 | 9/1986 | Opfer et al. | 428/213 |
| 4,631,202 | 12/1986 | Opfer et al. | 427/131 |
| 4,749,459 | 6/1988 | Yamashita | 204/192.15 |
| 4,786,564 | 11/1988 | Chen et al. | 428/694 |
| 4,789,598 | 12/1988 | Howard | 428/408 |
| 4,816,127 | 3/1989 | Eltoukhy | 204/192.15 |
| 5,004,652 | 4/1991 | Lal et al. | 428/611 |
| 5,045,165 | 9/1991 | Yamashita | 204/192.16 |
| 5,049,451 | 9/1991 | Lal et al. | 428/611 |

FOREIGN PATENT DOCUMENTS

| | | |
|---|---|---|
| 0145157 | 6/1985 | European Pat. Off. |
| 0275455 | 7/1988 | European Pat. Off. |
| 0350940 | 1/1990 | European Pat. Off. |
| 59-061106 | 9/1982 | Japan |
| 58-200513 | 11/1983 | Japan |
| 59-61107 | 4/1984 | Japan |
| 59-088806 | 5/1984 | Japan |
| 63-106917 | 5/1988 | Japan |

OTHER PUBLICATIONS

F. K. King, "Datapoint Thin Film Media", IEEE Trans on Magnetics, Jul. 1981.
P. A. Flinn, et al., "A New X-Ray Diffractometer Design for Thin-film Texture, Strain, and Phase Characterization", J. Vac. Sci. Technol., Nov./Dec. 1988.
Ishikawa et al., "Film Structure and Magnetic Properties of CoNiCr/Cr Sputtered Thin Film", IEEE Trans. on Magnetics, Sep. 1986.
R. M. Bozorth, "Ferromagnetism", D. Van Nostrand Company, Inc., Mar. 1951.
Boyer, et al., "Metals Handbook" (Desk Edition) American Society for Metals, Nov. 1985.

(List continued on next page.)

Primary Examiner—Paul J. Thibodeau
Assistant Examiner—Stevan A. Resan
Attorney, Agent, or Firm—Skjerven, Morrill, MacPherson, Franklin & Friel

[57] ABSTRACT

A magnetic thin film alloy comprising cobalt, chromium, nickel and platinum for horizontal recording has a high coercivity, good corrosion resistance, and good noise performance. The platinum has a concentration between 8 to 15 atomic percent, the chromium has a concentration of 3 to 8%, the nickel concentration is 5 to 10% and the balance consist of essentially cobalt. The magnetic alloy has a thickness less than 100 nm and is sputtered on an undercoat consisting of nickel and phosphorus. The phosphorus content is between 5 to 30 weight percent, and the nickel phosphorus has a thickness between 5 and 100 nm. Alternatively, other amorphous metallic thin film undercoats can be applied. By judicious selection of the amount of chromium and nickel in the alloy, the saturation magnetization can be kept high while still maintaining good corrosion resistance. In addition, the sputtered media exhibits low noise.

26 Claims, 16 Drawing Sheets

OTHER PUBLICATIONS

M. Yanagisawa, "Corrosion-resisting Co-Pt Thin Film Medium For High Density Recording," IEEE Transactions on Magnetics, vol. MAG-19, No. 5, Sep. 1983.

M. Kryder, "Magnetic Recording in the Year 2000", IEEE. Trans. on Magnetics, Nov. 1989.

T. Yogi, et al., "Longitudinal Media for 1 Gb/in$^2$ Areal Density", Research Report published by IBM, Apr. 17, 1990.

J. K. Howard, "Thin Films For Magnetic Recording Technology: A Review", Journal of Vacuum Science and Technology, Jan. 1986.

Opfer, et al., "Thin Film Memory Disc Development", Hewlett Packard Journal, Nov. 1985.

Aboaf, et al., "Magnetic Properties and Structure of Cobalt-Platinum Thin Films", IEEE Trans. on Magnetics, Jul. 1983.

Iwasaki, et al., "Co-Cr Recording Films With Perpendicular Magnetic Anisotropy" IEEE Trans. on Magnetics, Sep. 1978.

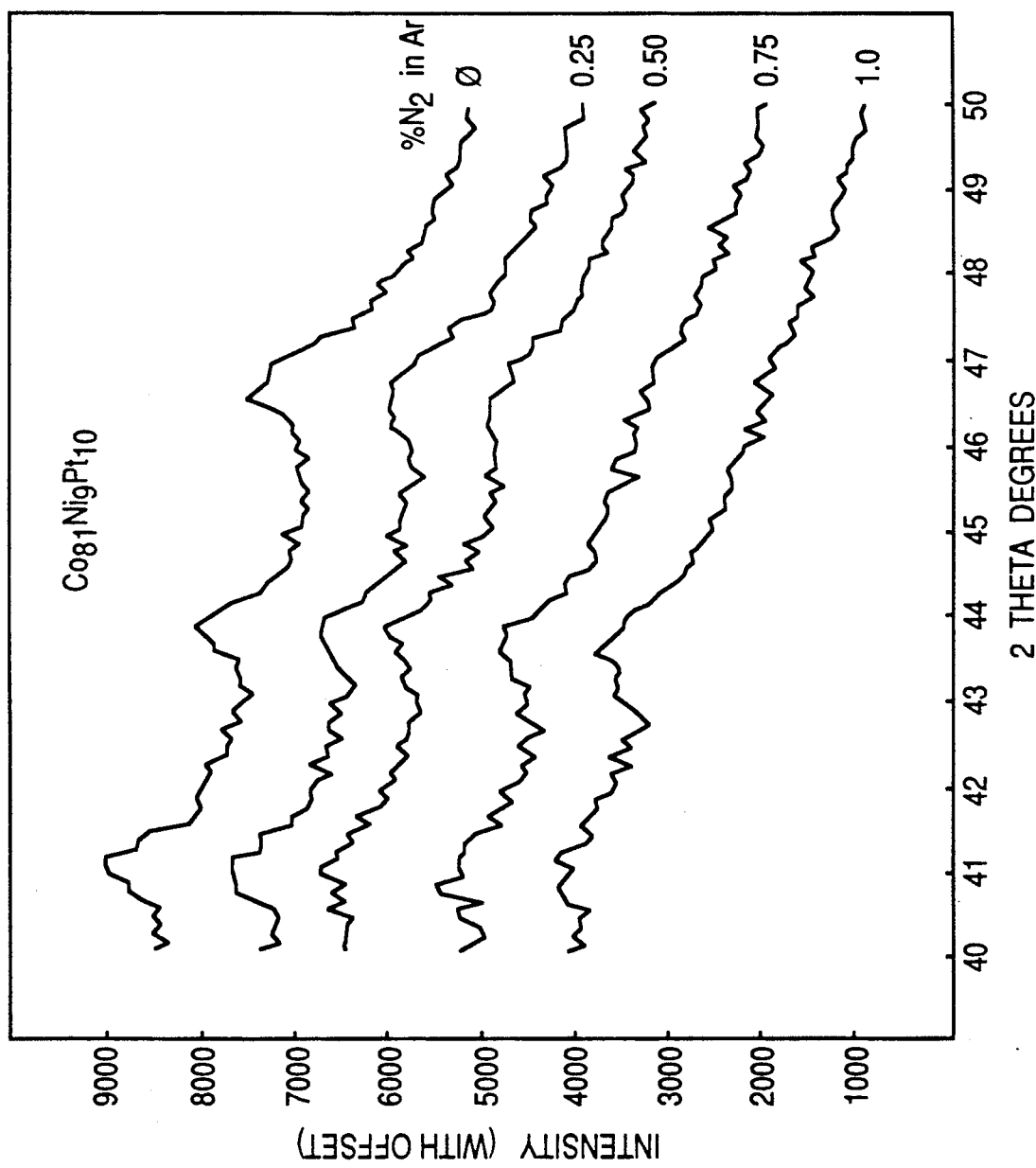

MAGNETIC RECORDING MEDIUM COMPRISING A MAGNETIC ALLOY LAYER OF COBALT NICKEL, PLATINUM AND CHROMIUM FORMED DIRECTLY ON A NICKEL ALLOY AMORPHOUS UNDERLAYER

BACKGROUND OF THE INVENTION

This invention relates to magnetic alloys for use in thin film magnetic recording media for horizontal recording.

Cobalt-based alloys are widely used for horizontal magnetic recording in thin film magnetic disks. The cobalt-based alloys are typically deposited by plating, sputtering or vacuum deposition. Typical alloys used in films of magnetic media include Co-Ni, Co-Ni-Cr, Co-Cr-Ta, Co-Pt, Co-Ni-Pt, Co-Cr-Pt, Co-Sm and Co-Re. Magnetic alloys used for thin film media must generally satisfy the following criteria. First, the alloy coercivity must be sufficiently high to support a high recording density. Second, the saturation magnetization must be high to produce a strong output signal for a given film thickness. Third, the signal to noise ratio provided by the magnetic alloy should be high. Fourth, the alloy should exhibit as a high corrosion resistance as possible. Fifth, alloy selection should minimize manufacturing costs. Optimization of these criteria is extremely difficult.

As mentioned above, to support a high recording density, the coercivity Hc must be high enough to sustain a high density of flux reversals per linear inch. For typical high density applications, coercivity is 1200 Oe or higher, and it is projected that much higher coercivity may be required by the year 2000 as described by M. Kryder in Data Storage in 2000—Trends in Data Storage Technologies, IEEE Trans. on Magnetics, (November, 1989), incorporated herein by reference. Also see T. Yogi et al., "Longitudinal Media for 1 Gb/in$^2$ Areal Density", Research Report, published by IBM, Apr. 17, 1990. Thus, providing a high alloy coercivity is extremely important.

In order for the media to provide a strong output signal during read-back, the media should have an intrinsically high saturation magnetization Ms greater than or equal to approximately 400 emu/cc and preferably 600 emu/cc or higher. The media should also have a high hysteresis loop squareness S (S=Mr/Ms) of at least 80% to provide a high magnetic remanent Mr. The strength of the read-back signal received from the read-write head (in the case of a single element inductive head where the same coil is used for both reading and writing) is proportional to film thickness T times the magnetic remanent Mr. Mr×T should generally be greater than or equal to $1 \times 10^{-3}$ emu/cm$^2$, and usually greater than $2 \times 10^{-3}$ to $3 \times 10^{-3}$ emu/cm$^2$ to provide a sufficiently strong output signal for a practical disk drive. If one can achieve a high magnetic remanent Mr, one can use a thinner alloy film, thereby using less magnetic alloy in the manufacturing process, and thus having lower manufacturing costs. Also, by forming thinner alloy films, the sputtering apparatus may be opened up and cleaned less frequently.

The above-described magnetic parameters are described in greater detail in the article "Thin Film Magnetic Recording Technology: A Review" by J. K. Howard, published in the Journal of Vacuum Science and Technology, January 1986, incorporated here and by reference.

Co-Pt alloys are well known in the art, and exhibit high saturation magnetization and can exhibit high coercivity. Co-Pt alloys have been described, for example, by Opfer et al. in "Thin Film Memory Disk Development", Hewlett-Packard Journal, November 1985, pages 4–10, Aboaf et al., in "Magnetic Properties and Structure of Cobalt-Platinum Thin Films", IEEE Trans. on Magnetics, pages 1514–1519, July 1983, and U.S. Pat. No. 4,438,066, issued to Aboaf et al., each incorporated herein by reference. The Aboaf article indicates that up to a Pt concentration of 25 atomic percent coercivity increases as Pt content increases. (See Aboaf article FIG. 3 and the accompanying text on page 1515.) (Hereinafter, the abbreviation at. % is used to refer to atomic percent.)

One problem with Co-Pt alloys is their lower resistance to corrosion. It is generally known to add Cr to a Co-Pt alloy to form a ternary alloy in order to enhance corrosion resistance. U.S. Pat. No. 4,789,598 issued to Howard, et al. incorporated herein by reference, advocates a Cr content of 17 at. % to provide corrosion protection (and to reduce noise). Japanese laid open patent application 59-88806, filed by Yanagisawa et al., incorporated herein by reference, describes an experiment in which a number of disks, including Co-Cr-Pt alloys with a Cr content between 6 and 17 at. % were immersed in water at 25° C. It was claimed by Yanagisawa that there was no loss in saturation magnetization (a symptom of corrosion) as a result. (See Yanagisawa FIG. 4.)

We performed our own experiment on disks including ternary alloys of Co, Cr and Pt alloys with a Pt content from 10 to 11 at. % and a Cr content varying from 6.5 to 13.2 at. %. The disks included an Al substrate, a Ni-P plated underlayer, a Ni-P sputtered underlayer, the Co-Cr-Pt alloy, and a 35 nm thick carbon overcoat. The disks were immersed in water at 80° C. for 24 hours. We discovered that Cr adequately protected the ternary Co-Cr-Pt alloys if the Cr content was at least 10 at. %. The ratio of final to initial saturation magnetization Ms compared with Cr content is graphed in FIG. 1. This experiment uses more aggressive conditions than Yanagisawa to show the effect of Cr as corrosion protection, and demonstrates that the alloy's ability to resist corrosion increases markedly at a Cr content of about 10%.

Although Cr is advantageous in that it retards corrosion, addition of Cr is also disadvantageous in that it decreases alloy saturation magnetization Ms. FIG. 2 illustrates saturation magnetization 4πMs versus Cr content for a binary Co-Cr alloy in bulk form. (4πMs is measured in units of Gauss.) (Cr similarly reduces the saturation magnetization Ms of Co-Pt alloys.) As can be seen, 4πMs drops rapidly, such that if Cr equals about 25 at. %, 4πMs drops to essentially zero. At a Cr content of 10 at. %, 4πMs drops from about 18,000 to 11,000 Gauss. The data in FIG. 2 is similar to the behavior for thin film Co-Cr, e.g. as described in FIG. 1 of "Co-Cr Recording Films With Perpendicular Magnetic, Anisotropy" by Iwasaki et al., IEEE Trans. Mag. Vol. Mag-14, No. 5, Sept. 5, 1978, pages 849–851, incorporated herein by reference. Thus, if one wanted to retard corrosion in an alloy by adding Cr, but wanted to retain a constant value for the parameter Mr×T, adding Cr would mean that thickness T would have to be increased. As mentioned above, this would make the media more expensive. Further, making the magnetic alloy thicker degrades the recording performance and recording density. Thus, Cr addition to retard corrosion should be minimized if possible to avoid degrading Ms.

As indicated above, it is also necessary to minimize noise in magnetic media. U.S. Pat. No. 4,789,598, issued to Howard et al., indicates that noise can also be reduced in a Co-Pt alloy by adding Cr such that the Cr concentration is greater than at. 17%. As can be seen in FIG. 2, addition of 17 at. % Cr to pure Co would drop $4\pi Ms$ to about 6000 Gauss. Based on the information contained in Howard FIG. 4, one can calculate that Howard experiences a $4\pi Ms$ of 3973 Gauss for his ternary Co-Cr-Pt alloy. Such saturation magnetization values are undesirably low. (The discrepancy between the 6000 Gauss predicted by FIG. 2 and the 3972 Gauss predicted by Howard FIG. 4 might be because 1) Howard's alloy contains Pt and FIG. 2 provides data for alloys lacking Pt, and 2) Howard's data is based on a thin film alloy, and FIG. 2 is for bulk Co-Cr.)

In order to obtain the optimal combination of high coercivity, saturation magnetization, corrosion resistance, low noise, and low production costs, selection of the magnetic alloy and selection of alloy composition range are key factors. High Pt content is necessary to increase coercivity, but adds to the cost of the fabrication. Cr content can be increased to enhance corrosion resistance. However, as mentioned above, Cr greatly reduces saturation magnetization Ms. Thus, the Cr content must be minimized to provide a sufficiently high saturation magnetization Ms while still adequately protecting against corrosion.

SUMMARY OF THE INVENTION

A magnetic alloy film comprises Co, Ni, Cr and Pt, the Pt having a concentration between 8 to 15 at. %, the Ni concentration being between 5 to 10 at. %, and the Cr being between 3 to 8 at. %. The Co content should exceed about 75 at %. In one embodiment, the alloy is a quaternary alloy. The alloy is formed by vacuum deposition (typically sputtering) on a vacuum-deposited Ni alloy underlayer. In one embodiment, the Ni alloy underlayer is sputtered Ni-P. With the magnetic film thickness below 100 nm, the Co-Ni-Cr-Pt alloy exhibits a coercivity greater than 1200 Oe.

Despite the fact that in a Co-Cr-Pt alloy, our own experimental data predicts that about 10 at. % Cr is required to achieve adequate corrosion protection, we have made the surprising discovery that with a minimal amount of Cr (as low as 3 at. %), the quaternary alloy Co-Ni-Cr-Pt film exhibits good corrosion resistance, good noise performance and a high magnetic remanent.

To improve noise performance, Howard reported that a Cr concentration in excess of 17% was required. We have discovered, however, that by adding Cr and Ni in appropriate ratios to Co-Pt, e.g. a $Co_{76}Ni_8Cr_6Pt_{10}$ alloy, the total amount of Cr and Ni in the alloy can remain low, thus minimizing any adverse effect on saturation magnetization, yet at the same time, an excellent signal to noise ratio and good corrosion resistance can be obtained.

These, and other advantages of our invention are described in greater detail below.

BRIEF DESCRIPTION OF THE DRAWINGS

FIG. 10c illustrates x-ray diffraction patterns of a $Co_{81}Ni_9Pt_{10}$ alloy sputtered in an argon atmosphere with nitrogen concentrations of 0, 0.25, 0.50, 0.75 and 1.0% by volume.

DETAILED DESCRIPTION

Figure 3:
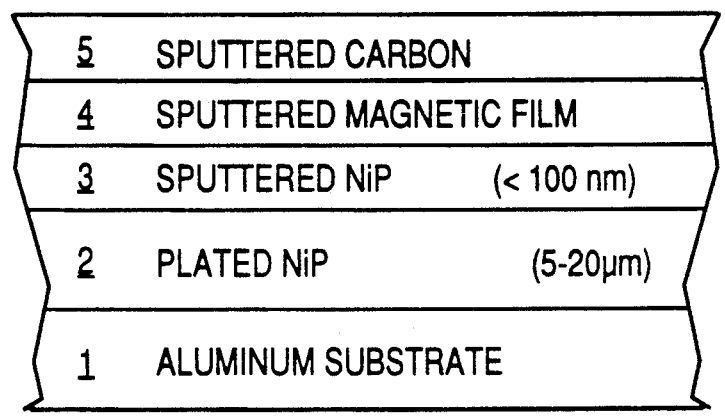
FIG. 3 illustrates in cross section a magnetic disk constructed in accordance with one embodiment of our invention.

FIG. 3 illustrates in cross section a magnetic disk constructed in accordance with the present invention. The disk includes an aluminum alloy substrate 1 and a Ni-P alloy layer 2 electroless-plated onto substrate 1. Layer 2 has a thickness between 5 and 20 $\mu m$. The Ni-P layer 2 provides strong mechanical support on relatively soft aluminum substrate 1. Thus, the disk is less likely to sustain damage caused by the impact of a read-write head against the disk surface. After plating Ni-P layer 2, the disk is polished and cleaned. The Ni-P layer 2 is typically "textured" to reduce stiction between a read-write head and the surface of the resulting magnetic disk when the disk is rotated from a stationary position. Although the illustrated embodiment includes an aluminum substrate, other substrate materials such as glass may be used.

An amorphous Ni-P layer 3 is then vacuum-deposited onto layer 2. In one embodiment, this can be done as described in U.S. Pat. No. 4,786,564, issued to Chen et al., incorporated herein by reference. (In lieu of Ni-P, nickel alloyed with B, Al, Ga, In, C, Si, Ge, Sn, Pb, As, Sb, Bi, S, Se or Te may be used for layer 3. Also, in lieu of sputtering, other vacuum deposition techniques may be employed.) Typically, layer 3 is less than 100 nm thick and typically about 50 nm. A thinner undercoat is advantageous since the Ni-P sputtering targets are used up less frequently during manufacturing. Also, the sputtering machine can be cleaned less often, thus enhancing efficient utilization of the sputtering machine. The Ni-P alloy can be $Ni_2P$, $Ni_3P$ or other Ni-P alloys having different P concentrations. In one embodiment, the Ni-P contains 15 weight % P and 85 weight % Ni. The Ni-P layer 3 reduces noise and bit shift, and has also been found to increase coercivity. Layer 3 may be DC magnetron, RF diode or RF magnetron sputtered at a pressure of 5 to 40 milli-torr and a power density of 1 to 4 watts/$c^2$. In one embodiment, layer 3 is RF diode sputtered at 25 milli-torr and a power density between 2 and 3 watts/$cm^2$. Also, in one embodiment, the Ni-P sputtering target with a P content of 15 weight % can be sintered from Ni-P powder precipitated out of electroless plating solution. The P concentration can be adjusted by adding to the powder $Ni_2P$ or Ni-P alloys having other P concentrations.

Immediately after forming sputtered Ni-p layer 3, magnetic layer 4 is sputtered on the disk. Layer 4 is an alloy comprising Co, Ni, Cr and Pt. The Ni, Cr and Pt concentrations are about 5 to 10 at. %, 3 to 8 at. % and 8 to 15 at. %, respectively. The Co concentration is greater than about 75 at. %. In one embodiment, layer 4 is a RF diode sputtered $Co_{76}Ni_8Cr_6Pt_{10}$ alloy sputtered at 25 milli-torr and a power density of 2 to 3 watts/$cm^2$. Other examples of alloys which can be used are $Co_{76}Ni_8Cr_4Pt_{12}$ and $Co_{76}Ni_6Cr_4Pt_{14}$. In other embodiments, the Ni and Cr concentrations can be varied to optimize noise and corrosion resistance. However, the sum of Ni and Cr should not exceed about 15 at. % of the total alloy to maintain high saturation magnetization. Pt composition can be varied to adjust the coercivity of the film. The effect of Pt on Co alloys is discussed in the above-mentioned Opfer and Aboaf articles and the Aboaf patent. The Co concentration should exceed about 75%, and the sum of the Cr, Ni and Pt concentrations should be less than or equal to about 25 at. %.

In one embodiment, the coercivity of the film can be altered by introducing nitrogen or oxygen into the sputtering chamber, as taught in U.S. Pat. No. 4,749,459, issued to Yamashita et al., incorporated herein by reference. In one embodiment nitrogen having a concentration less than 2% by volume (and typically less than 1% by volume) is introduced into the sputtering chamber. Water vapor in the sputtering chamber should be minimized when sputtering Co-Ni-Cr-Pt, as taught in the '459 patent for Co-Ni-Pt.

Of importance, nitrogen can be used not only to control magnetic coercivity but also to improve hysteresis loop squareness S, and if provided in sufficient quantities, to reduce the vertical component of the alloy c-axis to improve recording performance. The effect of nitrogen on the alloy characteristics are discussed in more detail below. The combined use of nitrogen in a sputtering chamber and the Ni-P sputtered underlayer provides the interesting advantage that because Ni-P layer 3 enhances coercivity, more nitrogen is needed to reduce coercivity to a desired level. This additional nitrogen provides the advantage of improving recording performance.

Another reason why sputtering in the presence of nitrogen is especially advantageous in conjunction with our novel Co-Ni-Pt-Cr alloy is that Cr, which enhances alloy corrosion resistance, unfortunately degrades hysteresis loop squareness. This degradation in squareness tends to make output transition pulse signals from the media wider, thus increasing pulse width $PW_{50}$ (described below) and degrading resolution. Degradation in squareness also degrades the magnitude of the output signal. The presence of nitrogen in the sputtering chamber can offset this effect by enhancing hysteresis loop squareness. Thus, although normally providing Cr in a magnetic alloy leads to a disadvantageous drop in hysteresis loop squareness, sputtering our Co-Ni-Cr-Pt alloy in the presence of nitrogen eliminates this disadvantage.

Formed above layer 4 is a protective layer 5, which may be sputtered carbon, e.g. as discussed by F. K. King in "Datapoint Thin Film Media", IEEE Trans. on Magnetics, July 1981 incorporated by reference. In such an embodiment, layer 5 may be DC magnetron sputtered at 1 to 10 milli-torr of pressure (and in one embodiment, 5 millitorr) and a power density of 1 to 4 watts/$cm^2$ (and in one embodiment, 2 to 3 watts/$cm^2$). In another embodiment, layer 5 is carbon sputtered in the presence of hydrogen, e.g. as taught in U.S. Patent Application Ser. No. 07/473,540 filed by Tsutomu Tom Yamashita on Feb. 1, 1990, entitled "Method for Sputtering a Hydrogen-Doped Carbon Protective Film on a Magnetic Disk", now U.S. Pat. No. 5,045,165, incorporated herein by reference. In this embodiment, the carbon is sputtered in an atmosphere of about 20% by volume of $H_2$ in argon at a flow rate of 50 to 100 SCCM. In yet another embodiment, layer 5 is a $ZrO_0$ layer such as discussed in U.S. Pat. No. 4,898,774, issued to Yamashita et al., incorporated herein by reference. If layer 5 is $ZrO_2$, it may be RF magnetron sputtered at a pressure of 2 to 10 milli-torr (and preferably 2 to 6 milli-torr) and a power density of 2 to 3 watts/$cm^2$. Although carbon sputtered in the presence of hydrogen and sputtered $ZrO_2$ provide excellent corrosion protection, complete coverage of the media cannot always be ensured. Thus, it is important and advantageous that the alloy in accordance with our invention resist corrosion as well.

A conventional lubricant is then applied to the surface of protective layer 5.

Figure 2:
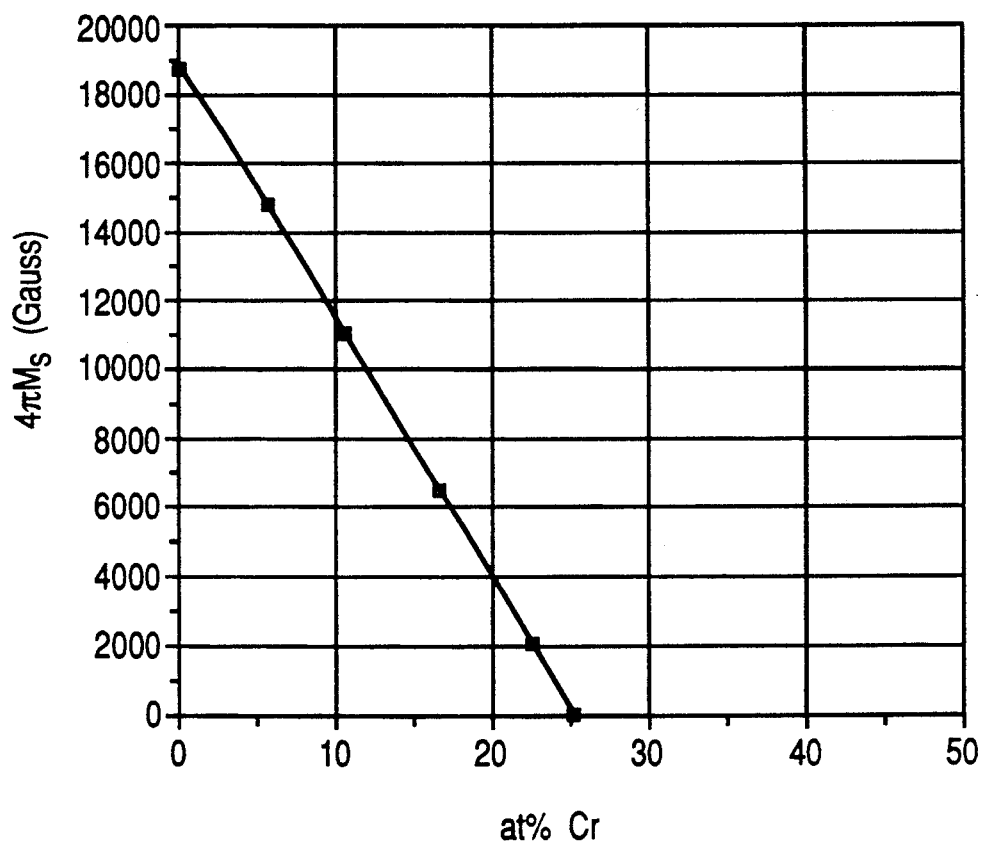
FIG. 2 illustrates the relation between saturation magnetization $4\pi Ms$ and Cr concentration in a Co-Cr binary alloy.
Figure 4:
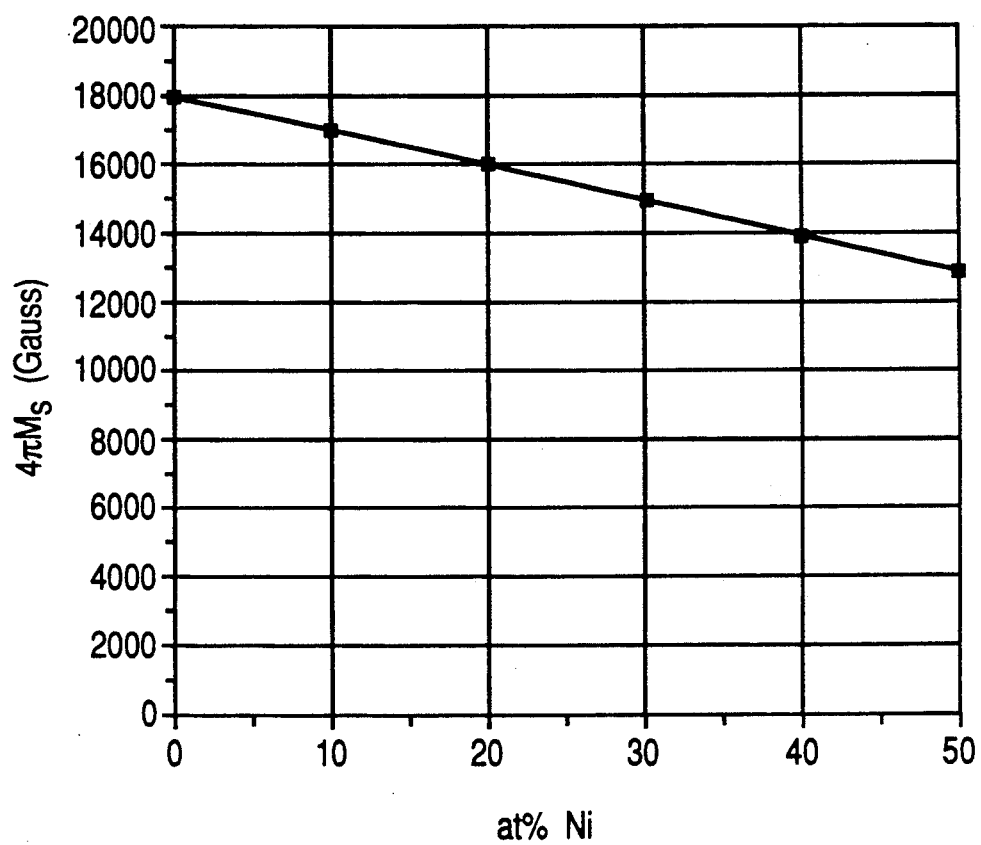
FIG. 4 illustrates the relation between saturation magnetization $4\pi Ms$ and Ni concentration in a Co-Ni binary alloy.

The novel magnetic alloy discussed herein achieves sufficient corrosion resistance and excellent noise performance with less Cr than previously required (e.g. by Howard and Yanagisawa) due to the addition of Ni to the magnetic alloy. Any element added to a Co alloy generally lowers the saturation magnetization $4\pi Ms$, some more than others. The effect of Ni on the saturation magnetization Ms of Co is shown in FIG. 4. As can be seen by comparing FIGS. 2 and 4, Ni has a smaller effect on Ms than Cr. Addition of Pt to the alloy also lowers the alloy Ms, but the effect of Pt on Ms is also less than that of Cr.

A comparison of the saturation magnetization $4\pi Ms$ for several Co-Pt alloys are shown below in Table 1. The film thicknesses in all cases are selected to achieve similar readback signals, i.e., such that Mr x T equals about $4.0 \times 10^{-3}$ emu/$cm^2$. A comparison of $Co_{76}Ni_8Cr_6Pt_{10}$ and $Co_{78}Cr_{12}Pt_{10}$ shows that the value of $4\pi$Ms for the $Co_{76}Ni_8Cr_6Pt_{10}$ alloy is greater than the $Co_{78}Cr_{12}Pt_{10}$ because of the difference in Cr content.

TABLE I

| Alloy Composition | Data Source | Film Thickness (nm) | $4\pi$Ms (Gauss) | MsT ($\times 10^{-3}$) emu/cm$^2$ | Hc (Oersteds) |
|---|---|---|---|---|---|
| $Co_{76}Ni_8Cr_6Pt_{10}$ | Komag, Inc. | 60 | 8380 | 4.0 | 1600 max* |
| $Co_{81}Ni_9Pt_{10}$ | Komag, Inc. | 50 | 10000 | 4.0 | 1800 max* |
| $Co_{78}Cr_{12}Pt_{10}$ | Komag, Inc. | 65 | 7700 | 4.0 | 1300 max* |
| $Co_{90}Pt_{10}$ | Japanese Publication 58-200513 example 4 | 30 | 13500 | 3.2 | 850 |
| $Co_{80}Pt_{20}$ | Japanese Publication 58-200513 example 1 | 30 | 11400 | 2.7 | 1700 |
| $Co_{77}Pt_{23}$ | U.S. Pat. No. 4438066 | 50 | 7500 | 3.0 | 1700 |
| $Co_{80}Ni_{10}Pt_{10}$ | Japanese Publication 59-61106 example 2 | 50 | 9000 | 3.6 | 900 |
| $Co_{79}Cr_6Pt_{15}$ | Japanese Publication 59-88806 example 1 | 50 | 7000 | 2.8 | 600 |
| $Co_{68}Cr_{12}Pt_{20}$ | Japanese Publication 59-88806 example 3 | 50 | 3000 | 1.2 | 700 |
| $Co_{68}Cr_{20}Pt_{12}$ | U.S. Pat. No. 4,789,598 | 56 | 3972 | 1.77 | 1100 |

*Hc for the $N_2$ concentration in the sputtering chamber which maximizes Hc.

Figure 5:
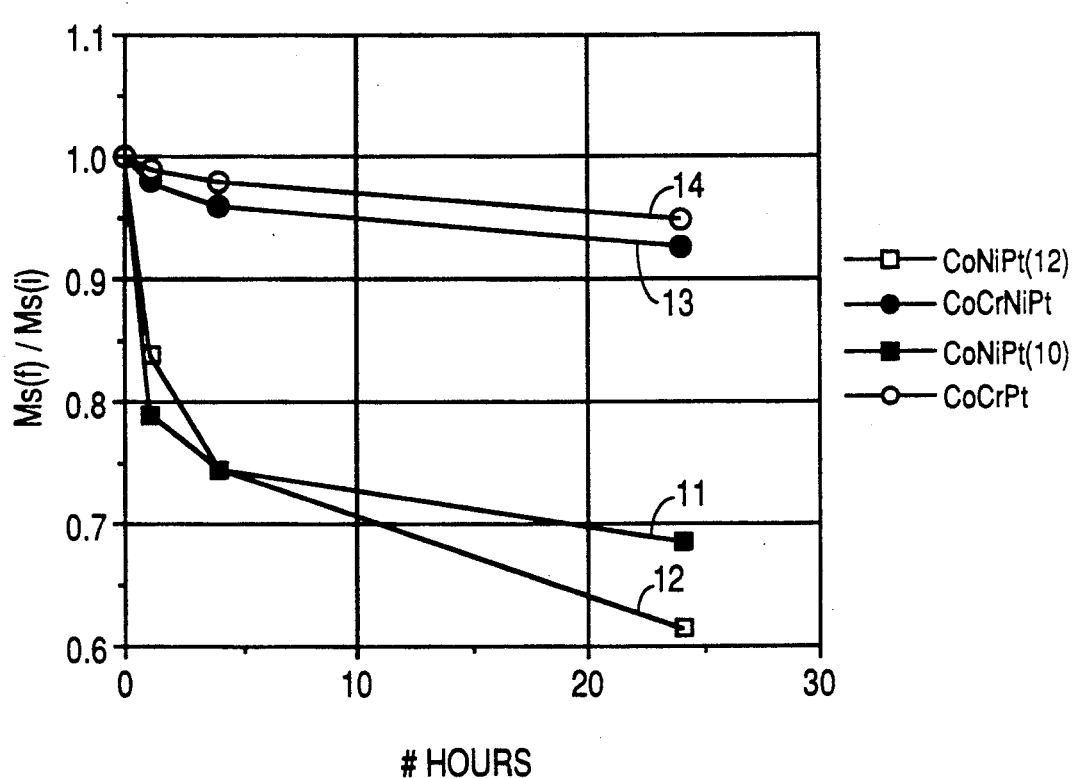
FIG. 5 illustrates corrosion data from an experiment in which magnetic disks including $Co_{81}Ni_9Pt_{10}$, $Co_{78}Cr_{12}Pt_{10}$, $Co_{79}Ni_9Pt_{12}$ and $Co_{76}Ni_8Cr_6Pt_{10}$ alloy films were immersed in an 80° C. water bath.

Corrosion performance data for various magnetic disks is shown in FIG. 5. The data was taken by measuring an initial saturation magnetization value Ms(i), and then immersing the disks in 80° C. water. Periodically, the saturation magnetization Ms was measured again. The ratio Ms(t)/Ms(i) versus time is graphed for disks 11 to 14. (Ms(t) is the saturation magnetization measured at time t.) These disks all included an Ni-P layer plated onto an Al substrate, a 50 nm thick Ni-P layer sputtered onto the plated Ni-P layer, a magnetic alloy sputtered onto the sputtered Ni-P, and 35 nm thick carbon sputtered onto the magnetic alloy. Disks 11 to 14 had the following compositions:

| Disk | Composition |
|---|---|
| 11 | $Co_{81}Ni_9Pt_{10}$ |
| 12 | $Co_{79}Ni_9Pt_{12}$ |
| 13 | $Co_{76}Ni_8Cr_6Pt_{10}$ |
| 14 | $Co_{78}Cr_{12}Pt_{10}$ |

As can be seen in FIG. 5, the disk including $Co_{78}Cr_{12}Pt_{10}$ and the disk including $Co_{76}Ni_8Cr_6Pt_{10}$ were most corrosion resistant. The $Co_{78}Cr_{12}Pt_{10}$ alloy resisted corrosion the best due to its high Cr content. However, as mentioned above, inclusion of 12% Cr in a Co alloy disk degrades saturation magnetization Ms, coercivity Hc, and other magnetic recording characteristics. Including 8 at. % Ni permits disk 13 to have a corrosion performance close to that of $Co_{78}Cr_{12}Pt_{10}$ disk 14 without this sacrifice in saturation magnetization Ms and coercivity Hc.

Figure 1:
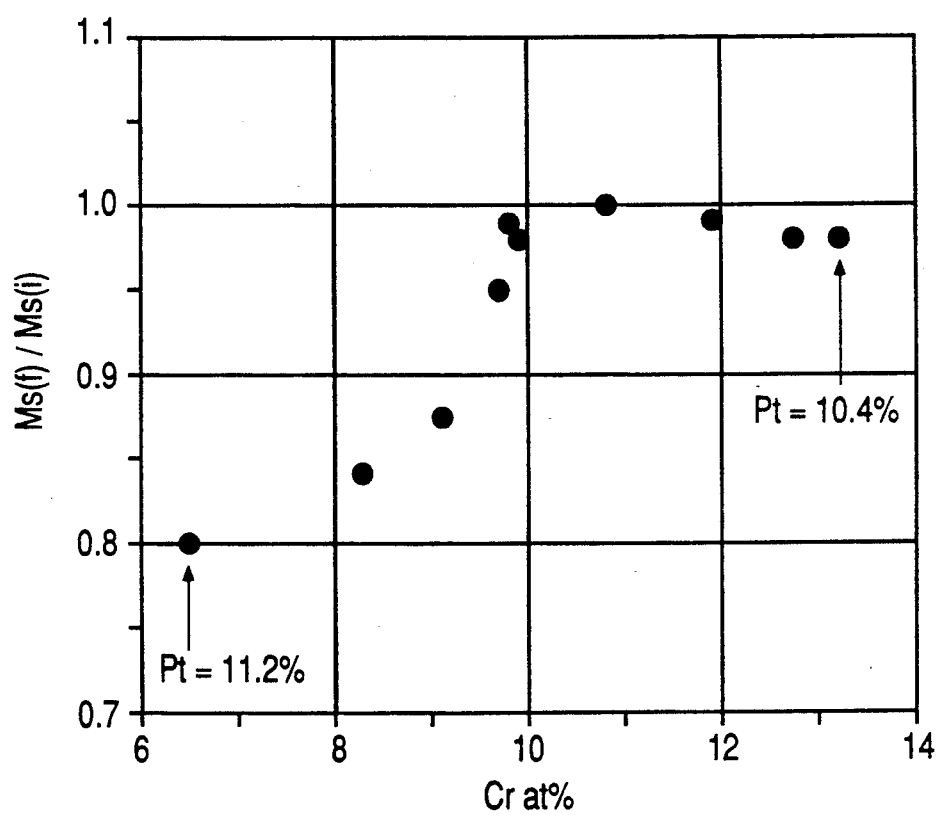
FIG. 1 illustrates data from an experiment in which Co-Cr-Pt alloys were immersed in an 80° C. water bath.

Of particular interest is the fact that the CoCrPt film having a Cr content of 6.5 at. % in FIG. 1 lost 20% of its saturation magnetization in 24 hours, while film 13, with just 6 at. % Cr, lost only 8% of its saturation magnetization Ms in 24 hours. (Alloy films 11 and 12 lacking Cr ($Co_{79}Ni_9Pt_{12}$ and $Co_{81}Ni_9Pt_{10}$) are significantly worse than Cr-containing films 13 and 14.) These results indicate that a significant portion of Cr can be traded for Ni while still retaining acceptable corrosion resistance. Thus, addition of Ni enhances alloy corrosion resistance for Co-Cr-Pt alloys.

Figure 6:
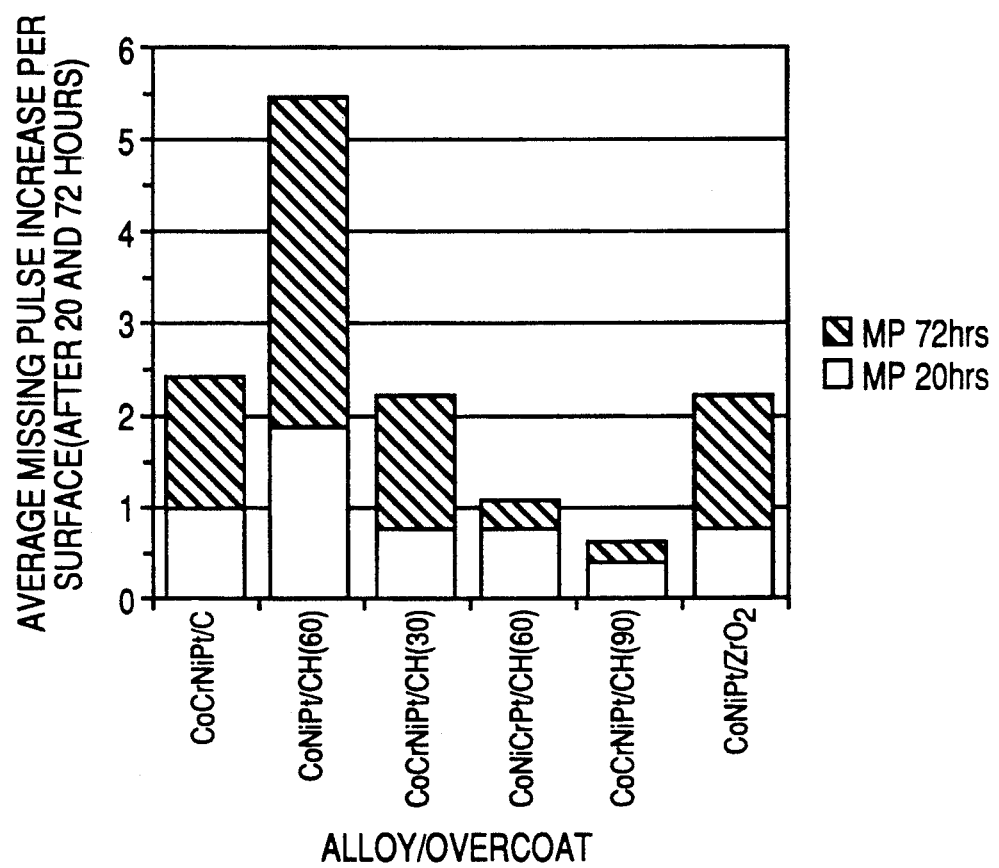
FIG. 6 illustrates corrosion data from an experiment in which magnetic disks including $Co_{81}Ni_9Pt_{10}$ and $Co_{76}Ni_8Cr_6Pt_{10}$ were subjected to an 80° C. 80% relative humidity air environment.

Corrosion performance for disks including films of $Co_{76}Ni_8Cr_6Pt_{10}$ and $Co_{81}Ni_9Pt_{10}$ and with different types of protective overcoats is shown in FIG. 6. The data in FIG. 6 was taken by placing the sample disks in 80° C. air at 80% relative humidity and measuring the number of "missing bits" caused by corrosion. A bit is defined as missing if the media output signal for a bit is less than 67% of its expected value. All films had the same Mr$\times$T value and all had a 35 nm thick protective overcoat as follows:

| Sample No. | Overcoat | Alloy |
|---|---|---|
| 31 | Carbon sputtered in 60 SCCM of argon with no $H_2$ present during sputtering. | $Co_{76}Ni_8Cr_6Pt_{10}$ |
| 32 | Carbon sputtered in an atmosphere with a flow rate of 60 SCCM at 20% $H_2$/80% Ar. (Percentages listed herein are by volume.) | $Co_{81}Ni_9Pt_{10}$ |
| 33 | Carbon sputtered in an atmosphere with a flow rate of 30 SCCM of 20% $H_2$/80% Ar. | $Co_{76}Ni_8Cr_6Pt_{10}$ |
| 34 | Carbon sputtered in an atmosphere with a flow rate of 60 SCCM of 20% $H_2$/80% Ar. | $Co_{76}Ni_8Cr_6Pt_{10}$ |
| 35 | Carbon sputtered in an atmosphere with a flow rate of 90 SCCM of 20% $H_2$/80% Ar. | $Co_{76}Ni_8Cr_6Pt_{10}$ |
| 36 | 95% $ZrO_2$/5% $Y_2O_3$ sputtered in Ar without $H_2$. | $Co_{81}Ni_9Pt_{10}$ |

All magnetic alloy films were deposited onto 50 nm thick sputtered Ni-P, which was formed on an Ni-P layer plated onto an Al substrate.

The best corrosion result in FIG. 6 is obtained for a $Co_{76}Ni_8Cr_6Pt_{10}$ film coated with a carbon overcoat sputtered in the presence of a flow of 90 SCCM of a 20% $H_2$/Ar mixture. Thus, the data in FIG. 6 confirms the interesting discovery that corrosion protection provided carbon is enhanced by sputtering the carbon in the presence of a large amount of $H_2$.

FIG. 6 also compares corrosion protection provided to a $Co_{81}Ni_9Pt_{10}$ alloy by carbon sputtered in the presence of a flow of 60 SCCM of a 20% $H_2$/80% Ar mixture and by sputtered $ZrO_2$. As can be seen, $ZrO_2$ provides exceptional corrosion protection, even compared with carbon sputtered in the presence of a flow of 60 SCCM 20% $H_2$/Ar mixture. $ZrO_2$ is also excellent as a protective layer for use with a $Co_{76}Ni_8Cr_6Pt_{10}$ alloy. Thus, the corrosion resistance exhibited by the alloy of the present invention and the corrosion protection provided by the $ZrO_2$ is a particularly effective combination. $ZrO_2$ overcoats are discussed in further detail in the above-incorporated U.S. Pat. No. 4,898,774.

Figure 7:
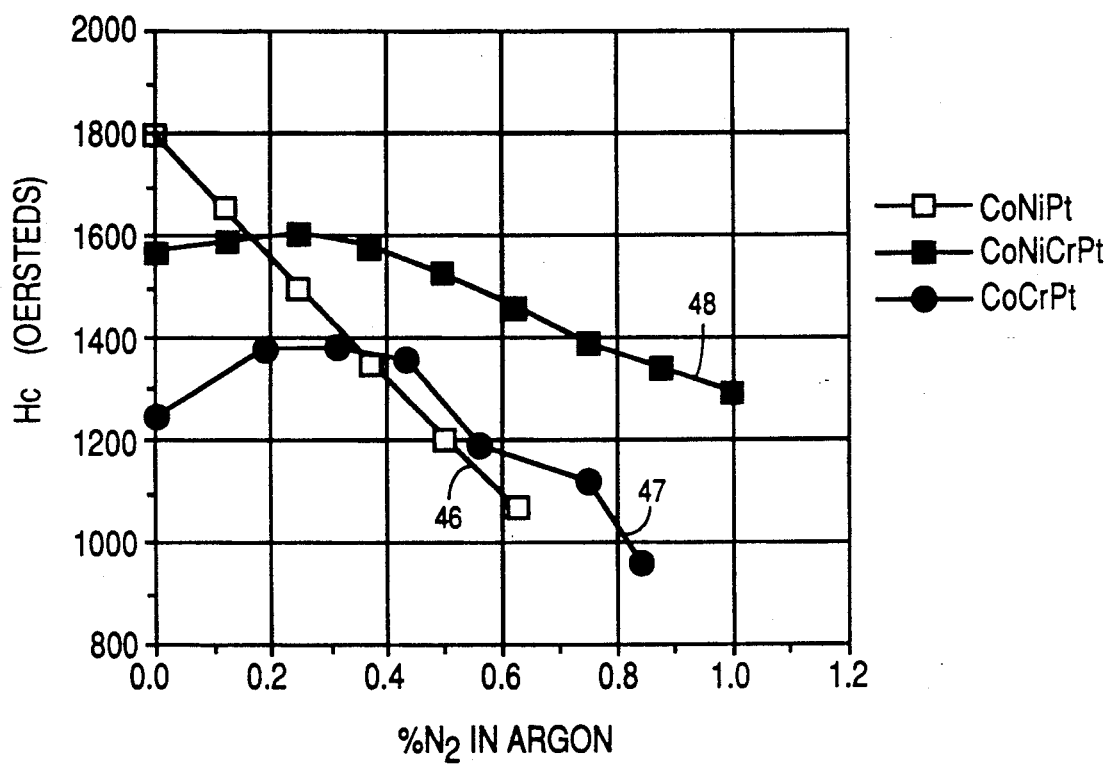
FIG. 7 illustrates the relationship between the coercivity of various sputtered alloys and the concentration of nitrogen in a sputtering chamber.

FIG. 7 shows the relation between coercivity (Hc) as a function of nitrogen concentration in the sputtering chamber used to form $Co_{81}Ni_9Pt_{10}$, $Co_{78}Cr_{12}Pt_{10}$ and $Co_{76}Ni_8Cr_6Pt_{10}$ alloy films 46, 47 and 48, respectively. Sputtering was accomplished in an argon atmosphere at 20 milli-torr of pressure. The addition of a small amount of nitrogen added to the Ar atmosphere in the sputtering chamber lowers coercivity Hc of the $Co_{81}Ni_9Pt_{10}$ alloy represented by curve 46. For $Co_{78}Cr_{12}Pt_{10}$ and $Co_{76}Ni_8Cr_6Pt_{10}$ (curves 47 and 48), the coercivity curve initially increases for small amounts of nitrogen (less than about 0.3%) and drops for alloys sputtered in the presence of a nitrogen concentration greater than 0.3%. The film thickness for the three alloy films 46 to 48 were such that $Mr \times T$ was on the order of $4 \times 10^{-3}$ emu/c$^2$ and the hysteresis loop squareness was about 0.8 to 0.9 for the films in the data set. Films 46 to 48 were formed on a 50 nm thick layer of Ni-P sputtered onto an Ni-P plated Al substrate.

As can be seen, $Co_{76}Ni_8Cr_6Pt_{10}$ achieved an Hc up to about 1600 Oe for this film thickness. One can select an Hc value below 1600 Oe conveniently without degrading $Mr \times T$. For example, by introducing 1% $N_2$ into the sputtering chamber, coercivity can be reduced from about 1600 Oe to 1300 Oe. Hysteresis loop squareness S and coercivity squareness S* actually is improved by adding nitrogen in the sputtering chamber.

By minimizing the Cr content, one can increase the maximum coercivity Hc for the Hc vs. $N_2$ curve (see FIG. 7). Thus, the $Co_{76}Ni_8Cr_6Pt_{10}$ films achieved higher coercivity than the $Co_{78}Cr_{12}Pt_{10}$ films. Therefore, providing a corrosion resistant alloy in accordance with our invention which minimizes the Cr concentration provides the added benefit of increased coercivity.

Figure 8:
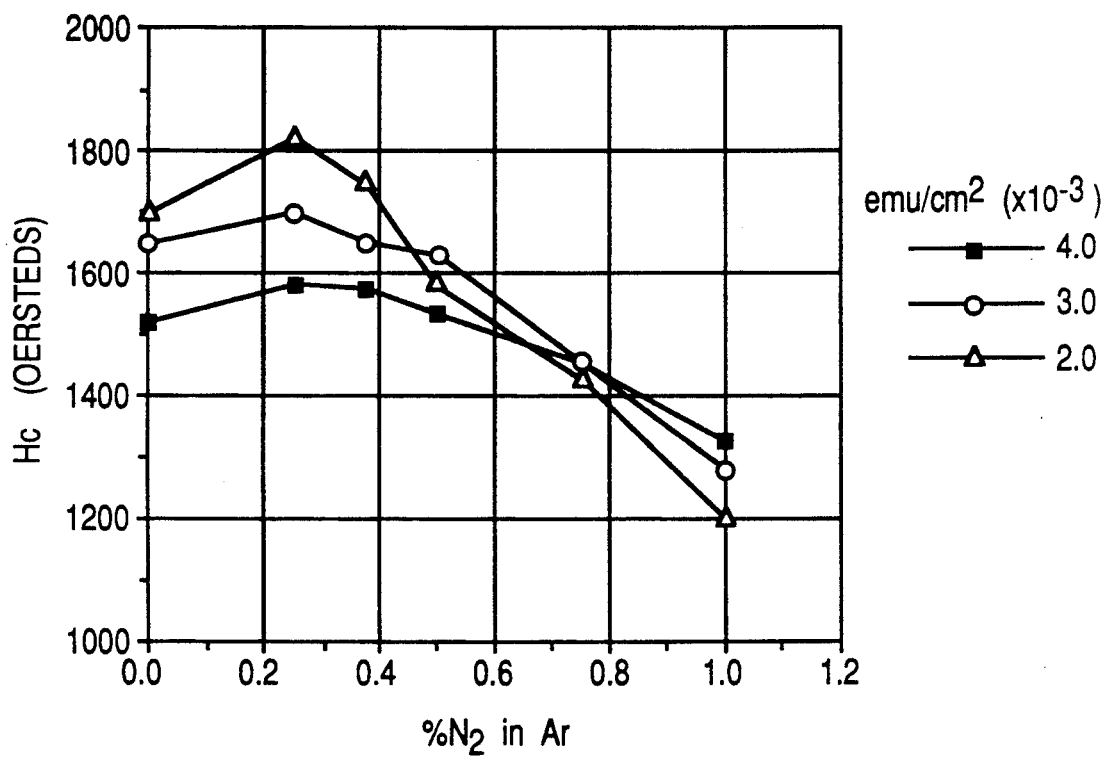
FIG. 8 illustrates the relation between the coercivity of $Co_{76}Ni_8Cr_6Pt_{10}$ films of various $Mr \times T$ values and the concentration of nitrogen in a sputtering chamber.

FIG. 8 compares coercivity vs. nitrogen concentration in a sputtering chamber for $Co_{76}Ni_8Cr_6Pt_{10}$ films which have $Mr \times T$ values of $4 \times 10^{-3}$ emu/cm$^2$, $3 \times 10^{-3}$ emu/cm$^2$ and $2 \times 10^{-3}$ emu/cm$^2$, respectively (i.e. for films of different thicknesses). As can be seen, as thickness is reduced, peak coercivity increases. Thus, the coercivity for films having a Mr x T value of $2 \times 10^{-3}$ emu/cm$^2$ have a maximum coercivity of 1800 Oe, while the films having a $Mr \times T$ value of $4 \times 10^{-3}$ emu/cm$^2$ have a peak coercivity less than 1600 Oe. The films of FIG. 8 were deposited on a 50 nm thick Ni-P layer sputtered onto an Ni-P layer which was plated onto an Al substrate. The films were covered with a 35 nm thick carbon overcoat.

Achieving high coercivity Hc with thinner magnetic film thickness is an important consideration for future disk drives, which are expected to require higher recording density. This can be achieved with higher coercivity Hc and lower $Mr \times T$ values. However, this reduction in $Mr \times T$ has the adverse effect of providing insufficient output signal amplitude that can be read over the disk drive system noise. Therefore media which can provide as high a coercivity Hc as possible for a given value $Mr \times T$ will be more advantageous for future generation disk drives.

Figure 9A:
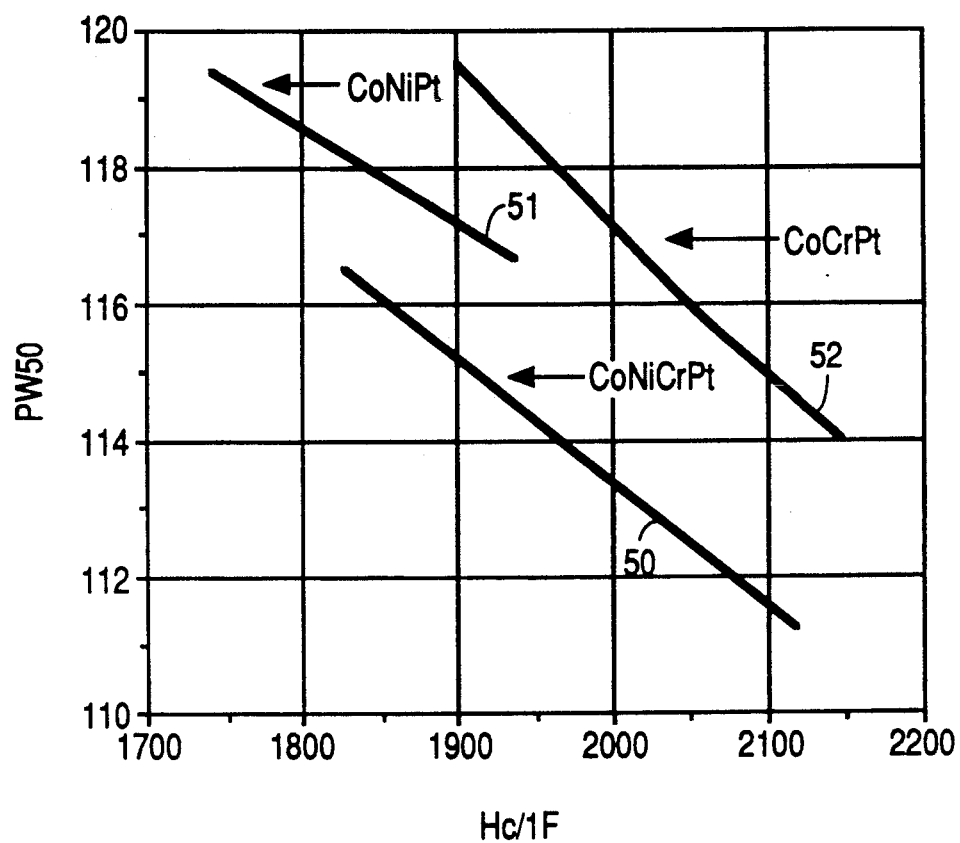
FIG. 9a illustrates the relationship between pulse width of the media output signal and the coercivity Hc divided by output signal pulse amplitude at a pulse frequency of 1.25 MHz.

FIG. 9a illustrates the relation between pulse width PW50 and a value Hc/1F defined as coercivity Hc divided by output signed pulse amplitude (measured in Oersteds per millivolt) for an output pulse frequency of 1.25 MHz. Pulse width PW50 is defined as the time duration in nano-seconds between the time a pulse rises to one-half of its peak value and the time it passes its peak and falls back to one-half of its peak value.

It is generally desirable to have a low pulse width PW50 in order to minimize intersymbol interference. Intersymbol interference occurs when output pulses from adjacent magnetic transitions begin to interfere with one another. Pulse width PW50 is a measure of the sharpness of the transition between magnetic domains, and generally becomes larger for higher values of $Mr \times T$. (Mr is related to the amplitude of the output pulse.) As can be in FIG. 9a, the curve 50 for $Co_{76}Ni_8Cr_6Pt_{10}$ shows a lower pulse width for any given value of Hc/1F than the $Co_{81}Ni_9Pt_{10}$ alloy (curve 51) or the $Co_{78}Cr_{12}Pt_{10}$ alloy (curve 52).

The data in FIG. 9a (and FIGS. 9b and 9c) was taken using a disk rotational speed of 3600 rpm, a test radius of 2.28 cm and a thin film head. The head had a pole tip width of 12 $\mu$m, a gap length of 0.54 $\mu$m, and a pole tip length of 3 $\mu$m. The head flight height was 0.196 $\mu$m, and used a current of 27 mA and 30 turns. The tester used was model No. RWA 2016, manufactured by Guzik, of Santa Clara, Calif. The disks had a diameter of 95 mm, and included an Al substrate, a plated Ni-P layer, a 50 nm thick Ni-P layer, a magnetic alloy, and a 35 nm thick carbon overcoat.

Figure 9B:
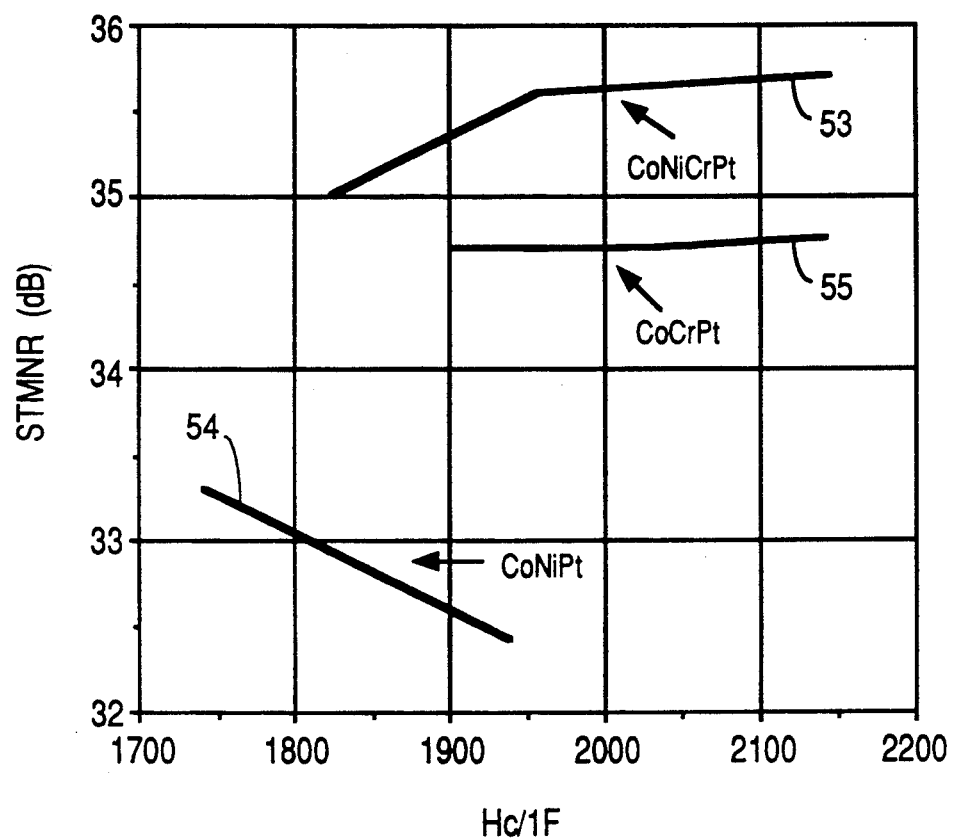
FIG. 9b illustrates the relationship between signal to media noise ratio and coercivity Hc divided by pulse output signal amplitude at a pulse frequency of 1.25 MHz.

FIG. 9b shows the relationship between signal to media noise ratio (STMNR) and Hc/1F. STMNR is defined as follows:

$$STMNR = 10 \log \left( (\text{peak amplitude})^2 / \left( \int_0^{10\text{MHz}} \text{background noise} \right)^2 \right).$$

$Co_{76}Ni_8Cr_6Pt_{10}$ noise characteristics (curve 53) are superior to those of $Co_{81}Ni_9Pt_{10}$ (curve 54) and $Co_{78}Cr_{12}Pt_{10}$ (curve 55) for each given value of Hc/1F.

Figure 9C:
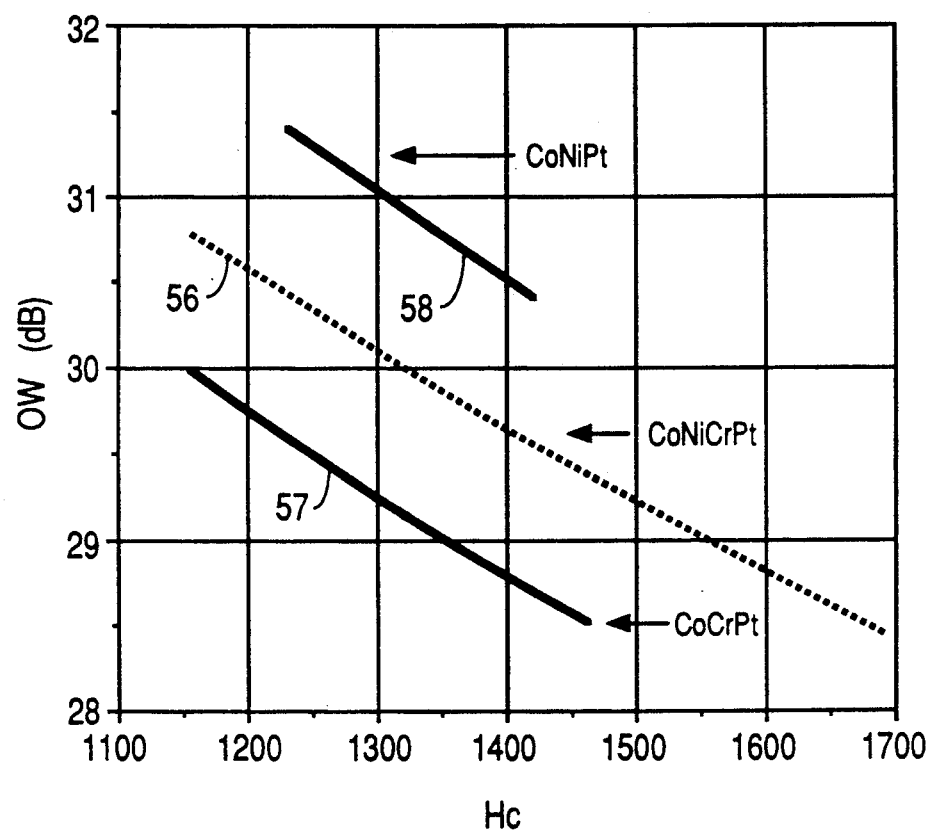
FIG. 9c illustrates the relationship between an overwrite figure of merit OW (described below) and coercivity Hc.

FIG. 9c shows the relationship between an overwrite figure of merit OW and Hc. The data in FIG. 9c was gathered by writing a set of pulses into the media at a frequency of 1.25 MHz, measuring the output signal pulse amplitude, writing a new set of pulses at a frequency of 3.35 MHz, and measuring the amplitude of the residual signal at 1.25 MHz after the 3.35 MHz pulses had been written. The ratio (in dB) of the residual 1.25 MHz signal after the over-write to the amplitude of the original 1.25 MHz pulses before over-write is the OW number represented in FIG. 9c. Again the data shows that OW in $Co_{76}Ni_8Cr_6Pt_{10}$ (curve 56) is higher than, and thus superior to the OW values for $Co_{78}Cr_{12}Pt_{10}$ (curve 57). The OW value for $Co_{76}Ni_8Cr_6Pt_{10}$ (curve 56) is worse than $Co_{81}Ni_9Pt_{10}$ (curve 58), but is still in acceptable range. The slight drop in OW is more than compensated by a greatly improved signal to noise ratio.

Addition of Cr to a Co-Pt alloy affects the amount of perpendicular orientation (i.e. perpendicular to the alloy film) of the c-axis of the hexagonal grains in the alloy. The c-axis has a strong tendency to orient perpendicular to the film plane. It is desirable to suppress the c-axis vertical orientation because otherwise the film tends to lose coercivity, and the hysteresis loop becomes less square. This degrades bit shift due to increased PW50 and decreased OW. Consequently, the media will lose its ability to achieve a high recording density. The relative extent of the c-axis preferred orientation in the film can be measured by the relative intensity of the reflection of x-rays off the (0002) plane with respect to intensity of other reflections during x-ray diffraction (c-axis is perpendicular to the (0002) plane).

Figure 10A:
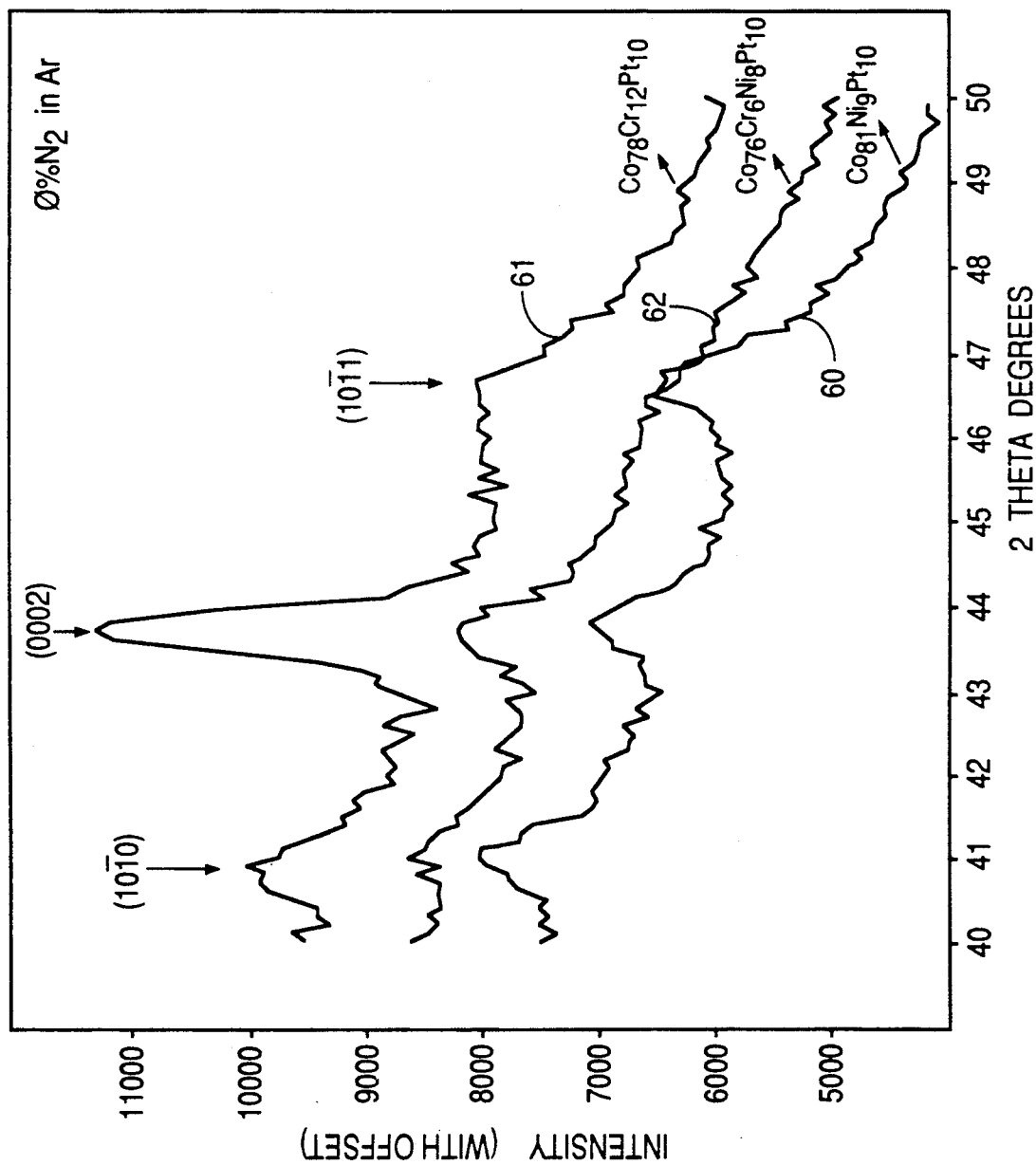
FIG. 10a illustrates x-ray diffraction patterns of $Co_{78}Cr_{12}Pt_{10}$, $Co_{76}Ni_8Cr_6Pt_{10}$ and $Co_{81}Ni_9Pt_{10}$ sputtered in argon without nitrogen.

FIG. 10a is an x-ray diffraction scan of $Co_{81}Ni_9Pt_{10}$ (curve 60), $Co_{78}Cr_{12}Pt_{10}$ (curve 6i), and $Co_{76}Ni_8Cr_6Pt_{10}$ (curve 62). The alloys of FIG. 10a were sputtered in argon in the absence of $N_2$. Glancing angle geometry known as Seehman-Bohlin diffraction geometry, e.g. as described by P. A. Flinn et al. in "A New X-Ray Diffractometer Design for Thin Film Texture, Strain and Phase Characterization", J. Vac. Sci. Technol., Nov./Dec. 1988, pages 1749 to 1755, incorporated herein by reference.

Figure 10B:
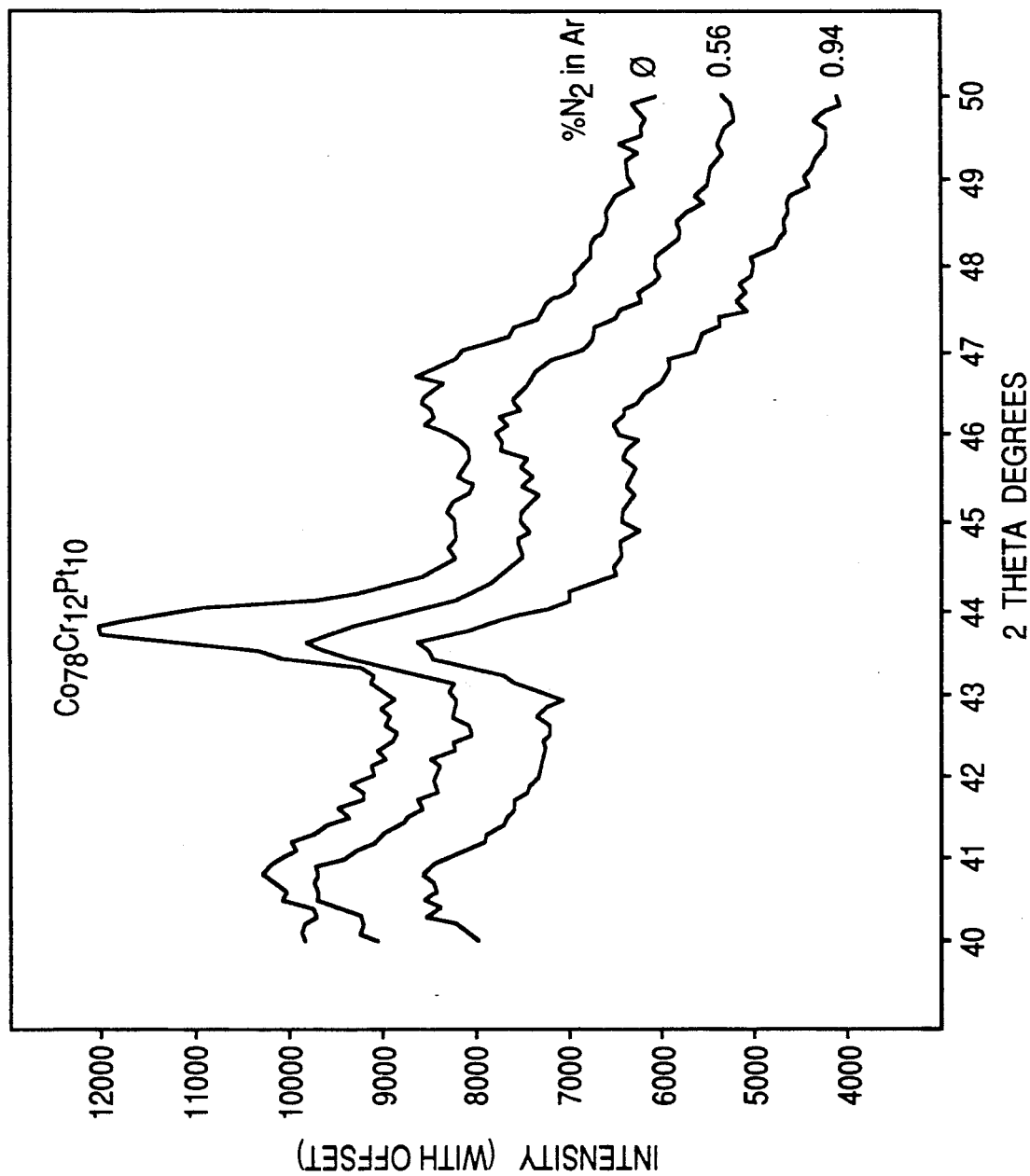
FIG. 10b illustrates x-ray diffraction patterns of a $Co_{78}Cr_{12}Pt_{10}$ alloy sputtered in an argon atmosphere with nitrogen concentrations of 0, 0.56 and 0.94% by volume.
Figure 10D:
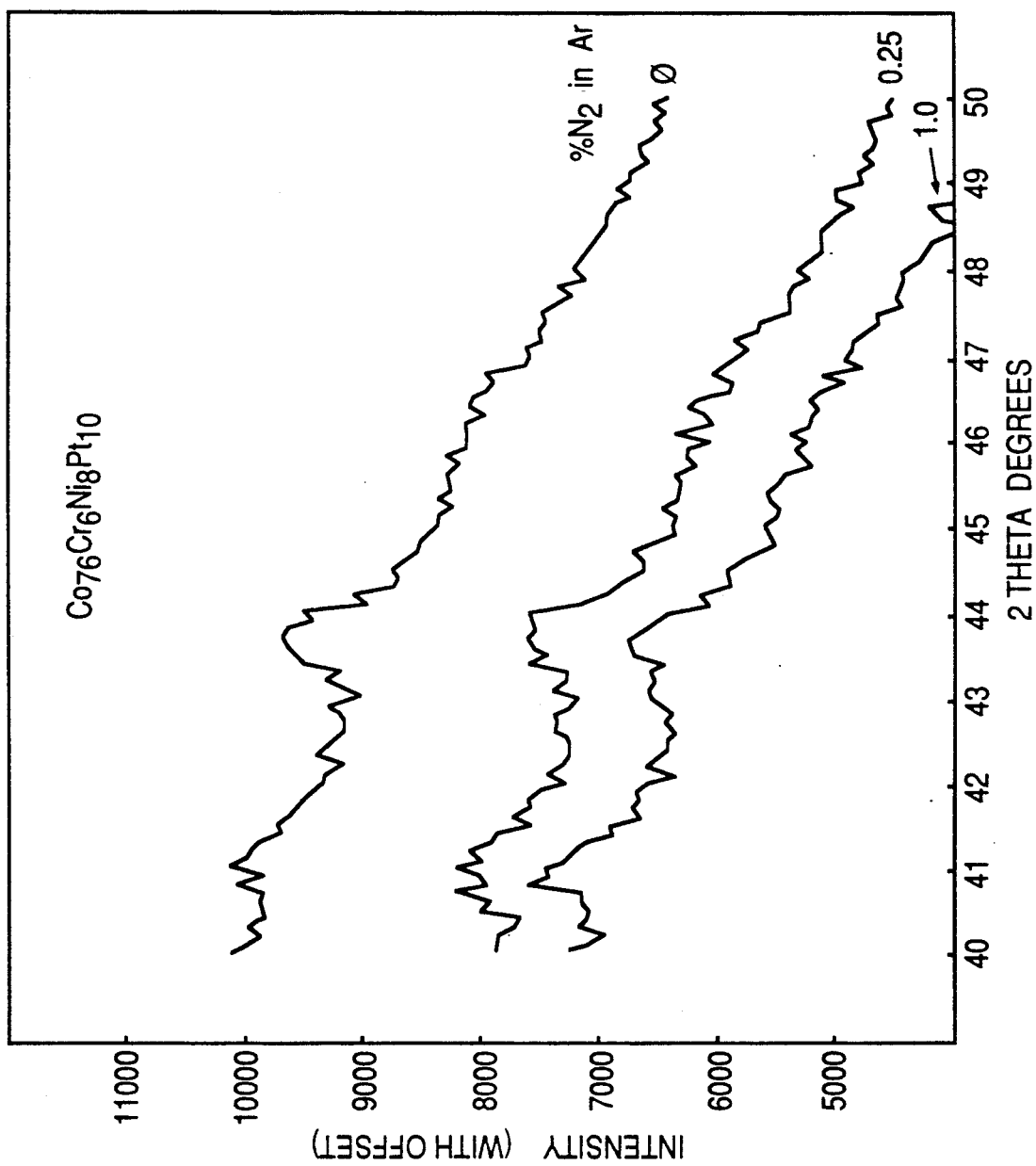
FIG. 10d illustrates x-ray diffraction patterns of a $Co_{76}Ni_8Cr_6Pt_{10}$ alloy sputtered in an argon atmosphere with nitrogen concentrations of 0, 0.25 and 1.0% by volume.

As can be seen in FIG. 10a, $Co_{78}Cr_{12}Pt_{10}$, which has the greatest amount of Cr of the three alloys shown has the highest intensity of (0002) plane reflection with respect to other plane reflections, which indicates strong vertical orientation of the grains in the film. As $N_2$ is admitted to the sputtering chamber, the vertical component decreases as shown in FIG. 10b for the $Co_{78}Cr_{12}Pt_{10}$ film. Similar decreases are observed for $Co_{81}Ni_9Pt_{10}$ and $Co_{76}Ni_8Cr_6Pt_{10}$ shown in FIGS. 10c and 10d. However, since there is less (0002) plane reflection for the $Co_{18}Ni_9Pt_{10}$ and $Co_{76}Ni_8Cr_6Pt_{10}$ alloys to begin with, the effect of $N_2$ on c-axis orientation is less noticeable.

Figure 11:
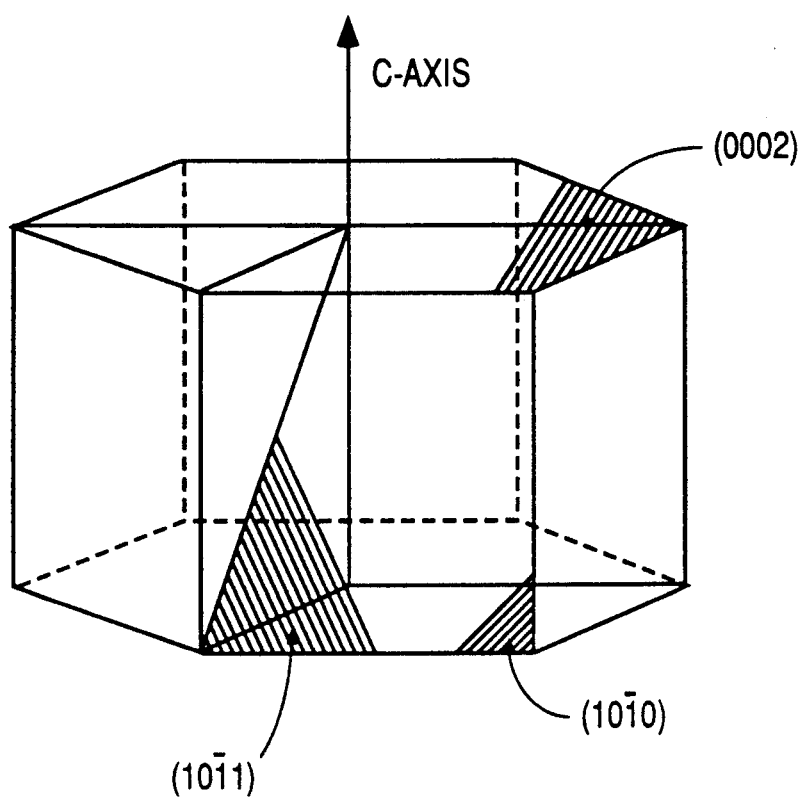
FIG. 11 illustrates the (0002), (10$\bar{1}$0) and (10$\bar{1}$1) crystal planes in cobalt.

Other reflections such as $(10\bar{1}0)$ and $(10\bar{1}1)$ are relatively weak to begin with, and appear less affected by the addition of nitrogen gas. (The orientation of the $(10\bar{1}0)$ and $(10\bar{1}1)$ planes in hexagonal crystal Co is shown in FIG. 11.) We theorize that $N_2$ introduces stacking faults into the Co alloy, and reduces the vertical orientation of Co grains. We believe that the effect of $N_2$ on the c-axis vertical component is most important for a disk using an alloy in accordance with our invention.

It is thought that Ni addition has a significant effect on the suppression of the vertical orientation of the c-axis for both Co-Ni-Pt and Co-Ni-Cr-Pt films. Hence adding Ni will reduce the vertical magnetization component of the media film, enhance hysteresis loop squareness S, reduce pulse width $PW_{50}$, enhance resolution, and enhance over-write characteristics.

While the invention has been described with respect to specific embodiments, those skilled in the art will appreciate that modifications may be made without departing from the spirit and scope of the invention. For example, deposition techniques other than sputtering, e.g. ion plating or evaporation, may be employed. Further, instead of using Ni-P for underlayer 3, other vacuum-deposited non-magnetic amorphous metallic materials may be used. Accordingly, all such changes come within the present invention.

We claim:

1. A magnetic thin film recording medium for horizontal recording comprising:
a substrate;
an amorphous of substantially amorphous metallic thin film undercoat formed on said substrate;
a magnetic layer formed directly on the undercoat by vacuum deposition, said magnetic layer being an alloy comprising cobalt, nickel, chromium and platinum, the platinum concentration being from about 8 to 15 atomic percent, the nickel concentration being about 5 to 10 atomic percent, the chromium concentration being from about 3 to 8 atomic percent and the balance comprising cobalt, the cobalt concentration being greater than or equal to about 75 atomic percent.

2. Structure of claim 1 wherein the sum of the nickel and chromium concentration is less than or equal to 15 atomic percent.

3. Structure of claim 1 wherein said balance consists essentially of cobalt.

4. Structure of claim 1 wherein said undercoat comprises nickel-phosphorus underlayer vacuum-deposited on said substrate, and said magnetic media is formed directly on said nickel-phosphorus underlayer.

5. The structure of claim 4 wherein said underlayer has a phosphorus concentration between about 5 and 30 weight percent and a thickness between 2.5 and 200 nm.

6. The structure of claim 1 wherein the coercivity of said alloy is between 800 and 2500 Oe.

7. Structure of claim 1 wherein said alloy is a sputtered alloy sputtered in the presence of nitrogen, said structure further comprising a sputtered carbon layer sputtered in the presence of hydrogen.

8. Structure of claim 1 wherein said magnetic layer has a coercivity of at least about 1200 Oe.

9. Structure of claim 1 further comprising a plated Ni-P underlayer formed between said substrate and said undercoat.

10. A method for forming a film of magnetic media on an amorphous of substantially amorphous metallic underlayer, said underlayer being formed on a substrate, said method comprising the step of vacuum depositing an alloy film directly on said underlayer, said alloy film comprising platinum having a concentration of about 8 to 15 atomic percent, nickel having a concentration of about 5 to 10 atomic percent, chromium having a concentration of about 3 to 8 atomic percent, and the balance comprising cobalt.

11. Method of claim 10 wherein said balance consists substantially of cobalt.

12. Method of claim 10, wherein said step of vacuum depositing comprises the step of sputtering.

13. Method of claim 12 wherein said step of sputtering is performed in an atmosphere containing nitrogen, the concentration of nitrogen in said sputtering chamber being less than about 2%.

14. Method of claim 13 further comprising the step of vacuum-depositing said underlayer on said substrate prior to said step of sputtering, said underlayer comprising a nickel alloy.

15. Method of claim 14 wherein said nickel alloy underlayer comprises Ni-P.

16. Method of claim 15 further comprising the step of sputtering a carbon protective layer onto said alloy, said carbon being sputtered in the presence of hydrogen.

17. Method of claim 10 wherein a plated Ni-P layer is formed between said substrate and said underlayer.

18. Method of claim 10 wherein said alloy film has a coercivity of at least about 1200 Oe.

19. A magnetic thin film recording medium for horizontal recording comprising:
a substrate;
a vacuum deposited nickel alloy film formed on said substrate; and
a magnetic alloy layer formed directly on said nickel alloy film by vacuum deposition, said magnetic layer comprising from about 8 to 15 atomic percent platinum, from about 5 to 10 atomic percent nickel, from about 3 to 8 atomic percent chromium, and more than about 75 atomic percent cobalt.

20. Structure of claim 19 further comprising a plated nickel-phosphorus alloy formed between said substrate and said nickel alloy film.

21. Structure of claim 19 wherein said nickel alloy film comprises nickel and at least one element selected from the group consisting of B, Al, Ga, In, C, Si, Ge, Sn, Pb, As, Sb, Bi, S, Se and Te.

22. Structure of claim 19 wherein said magnetic alloy layer has a coercivity of at least about 1200 Oe.

23. A method comprising the steps of:
vacuum depositing a nickel alloy film on a substrate; and
vacuum depositing a magnetic alloy directly on said nickel alloy film, said magnetic alloy comprising from about 8 to 15 atomic percent platinum, from about 5 to 10 atomic percent nickel, from about 3 to 8 atomic percent chromium, and more than about 75 atomci percent cobalt.

24. Method of claim 23 further comprising the step of plating a nickel-phosphorus layer onto said substrate prior to vacuum depositing said nickel alloy film.

25. Method of claim 23 wherein said nickel alloy film comprises nickel and at least one element selected from the group consisting of B, Al, Ga, In, C, Si, Ge, Sn, Pb, As, Sb, Bi, S, Se and Te.

26. Method of claim 23 wherein said magnetic alloy has a coercivity of at least about 1200 Oe.

* * * * *

UNITED STATES PATENT AND TRADEMARK OFFICE
CERTIFICATE OF CORRECTION

PATENT NO. : 5,180,640
DATED : January 19, 1993
INVENTOR(S) : Tsutomu T. Yamashita, Phuong Nguyen, and Tu Chen It is certified that error appears in the above-identified patent and that said Letters Patent is hereby corrected as shown below:

Col. 9, line 5, delete "$Co_{81}Ni_oPt_{10}$" and insert --$Co_{81}Ni_9Pt_{10}$--.

Signed and Sealed this

Fourteenth Day of December, 1993

*Attest:*

BRUCE LEHMAN

*Attesting Officer*  *Commissioner of Patents and Trademarks*